Patented June 2, 1931

1,808,225

UNITED STATES PATENT OFFICE

ERNEST HOPKINSON, OF NEW YORK, N. Y.

ADHESIVE COMPOSITION

No Drawing. Original application filed August 18, 1923, Serial No. 658,184. Divided and this application filed September 28, 1927. Serial No. 222,689.

This invention relates to an improved rubber-containing adhesive composition.

In the past rubber cements consisting of raw rubber dissolved in a solvent such as benzol, gasoline, etc. have been employed to bond surfaces together. For instance linings of shoes have been joined to the leather portion of the shoe in this manner. Rubber cements have also been used to hold bristles in brushes such as shaving brushes. These cements due to the use of the solvents mentioned are inflammable and expensive. Their expensiveness is due to the loss of the solvent or cost of maintaining solvent recovery apparatus. It is also difficult to manipulate these cements having a high rubber content due to their high viscosity. Hence a limit is placed in actual practice on the rubber content which must be such that the cement may be easily applied. These rubber cements also penetrate textile and other surfaces with difficulty and this fact is another objection to their use.

It is an object of this invention to provide a rubber cement which can contain a high percentage of rubber and remain sufficiently fluid to be easily manipulated. It is a further object to provide a rubber cement containing an aqueous dispersion of rubber and having its properties of viscosity, plasticity, adhesiveness and cohesiveness modified.

This case is a division of my copending application Serial No. 658,184, filed August 18, 1923, now Patent 1,657,472, Jan. 31, 1928.

Latex as such may be used as the adhesive and the following is an example of such use: Latex containing 35% of solid material and preserved with 1–2% of ammonia in accordance with the usual practice, where latex is transported to a distance from the plantations, is applied to the flesh side of each of two pieces of leather. The latex is allowed to soak into the leather surfaces and then a second coating is applied which is also allowed to stand until evaporation and absorption have occurred sufficient to leave the surfaces in a damp sticky state. The surfaces are then firmly pressed together and are allowed to stand thus producing a bond of dry rubber latex joining the two surfaces together. The bond thus produced when compared with an ordinary leather cement procured on the open market where both the latex and the cement were applied in approximately equal quantities in the manner indicated above tested as follows:

| Material | Stripping test | Flexing test |
|---|---|---|
| Latex (containing 35% solids) | 14 lbs. | 6 min. |
| Ordinary leather cement | 7½ lbs. | 2 min. |

The stripping test employed consisted in applying a tearing force by means of a machine to strip the pieces of leather apart and in the case of latex it will be observed approximately twice as great a force was used as where the ordinary leather cement was employed. In the flexing test a force was applied to flex the two pieces of leather rapidly in opposite directions and it will be observed that the latex bond showed no signs of separation until flexed three times as long as the ordinary leather cement.

It is often found desirable instead of employing latex as such to modify its properties including viscosity, plasticity, adhesiveness, cohesiveness and surface tension, to adapt it to the texture of various materials, particularly so that there will be the right amount of penetration and adhesiveness and a firm bond established between the two surfaces. For instance the lack of plasticity of latex is apt to cause it to penetrate dry or open texture leather too readily, rendering a single coat ineffective as a bond and making it likely that where successive coats are applied the latex will "strike through" or penetrate to the opposite surface of the material. This low plasticity is especially disadvantageous where the building up of layers of cemented fabrics is carried on as in "combining" cloth due to the fact that the latex is apt to pass through the cloth and appear on the outer surface. The following represents latex the properties of which have been altered: Latex equivalent to 100 parts by weight of dry rubber, 20 parts of dextrine, 2 parts of zinc oxide, 2 parts of sulphur, 4 parts of glue, 2 parts of oxy normal butyl thiocarbonic acid disulphide, which is a derivative of carbon disulphide, emulsified in solvent naphtha as indicated below, 2 parts of dibenzylamine also emulsified in solvent naphtha, 2 parts of Silurian shale. In combining the above substances the following procedure is preferably carried out:—The sulphur and zinc oxide are added to the dextrine and Silurian shale as a thick wet paste. An emulsion of oxy normal butyl thiocarbonic acid disulphide is made by dissolving 5 parts of this material in 40 parts of solvent naphtha, which mixture is then emulsified with 60 parts of water in the presence of 5 parts of glue. Similarly an emulsion is made of dibenzylamine using the same relative proportions of solvent naphtha, water and glue. Quantities of each of these emulsions equivalent to 2 parts of the oxy normal butyl thiocarbonic acid disulphide and the dibenzylamine respectively are now added to the latex mixture. This composition is a fluid mass which is applied to the flesh side of each of two sheets of leather and allowed to penetrate. A second coat is then applied if desired and allowed to stand until evaporation and absorption have occurred, whereupon the surfaces are firmly pressed together. Upon standing a vulcanized bond results. Instead of oxy normal butyl thiocarbonic acid disulphide and dibenzyl amine, any other suitable derivative of carbon disulphide and any other suitable amine may be used, such as those disclosed in patent to Cadwell 1,440,962.

In the above composition the dextrine, a hydrophil colloid serves to modify the viscosity and adhesiveness of the latex. It may be replaced in part or entirely by an equivalent amount of glue or other organic hydrophil colloid. Silurian shale acts to modify both the viscosity and plasticity and effects also the cohesiveness of the mass. Instead of Silurian shale, other colloidal clays may be used. Glue increases the viscosity and adhesiveness of the mass. Zinc oxide increases its plasticity. Glue and zinc oxide may be replaced by other organic colloids and other materials for altering the plasticity of the mass respectively if desired. Concentrated or dilute latex may be used instead of ordinary latex having a normal solid content. Tests of leather employing the modified latex composition compared with ordinary leather cement show similar improvement to that given above in connection with latex.

The latex composition above described can be employed for example in the manufacture of shoes. Parts of the uppers may be bonded by the composition or the upper may be bonded to a sole. Various other uses may be made of the composition in the manufacture of shoes and other leather articles. It will be further understood that the surfaces of various materials other than leather may be united by the composition. For example forms of fibrous material either as textile material or otherwise may be joined. The composition may be used to join cotton and cotton, woolen and woolen, fibres or cloth, and similarly between cotton and wool either in the form of fibres or cloth. Similarly laminae or greater thicknesses of wood may be united. Of course the materials mentioned and various other materials may be united to leather by the composition.

It will be understood that instead of normal latex containing 35% solids, diluted or concentrated latex may be employed if desired. Artificial aqueous dispersions of rubber can also be used.

It will be noted that the adhesive compositions above recited have in general the properties above set forth. The expensive inflammable solvents such as gasoline and solvent naphtha are generally avoided as well as the use of rubber which has been coagulated and milled to prepare it for solution, and from which on account of such operation certain valuable constituents have been lost. In general the compositions provided have improved wear-resistant and ageing properties. The compositions employed may be easily and quickly made.

As many apparently widely different embodiments of this invention may be made without departing from the spirit thereof, it will be understood that I do not intend to limit myself to the specific embodiment herein employed except as indicated in the appended claims.

Having thus described my invention, what I claim and desire to protect by Letters Patent is:

1. An adhesive composition for bonding porous material comprising an aqueous dispersion of rubber, an organic colloid, a colloidal clay, and a vulcanizing agent.

2. An adhesive composition for bonding porous material comprising an aqueous dispersion of rubber, an organic hydrophil colloid, a colloidal clay, and a vulcanizing combination comprising zinc oxide, sulphur, a derivative of carbon disulphide, and an amine.

3. A vulcanizable adhesive composition for bonding porous material comprising an aqueous dispersion of rubber, an organic colloid, a colloidal clay and vulcanizing ingredients.

4. A vulcanizable adhesive composition for bonding porous material comprising an aqueous dispersion of rubber, an organic colloid, a colloidal clay and low temperature vulcanizing ingredients.

Signed at New York, New York, this 26th day of September, 1927.

ERNEST HOPKINSON.